Patented Mar. 9, 1926.

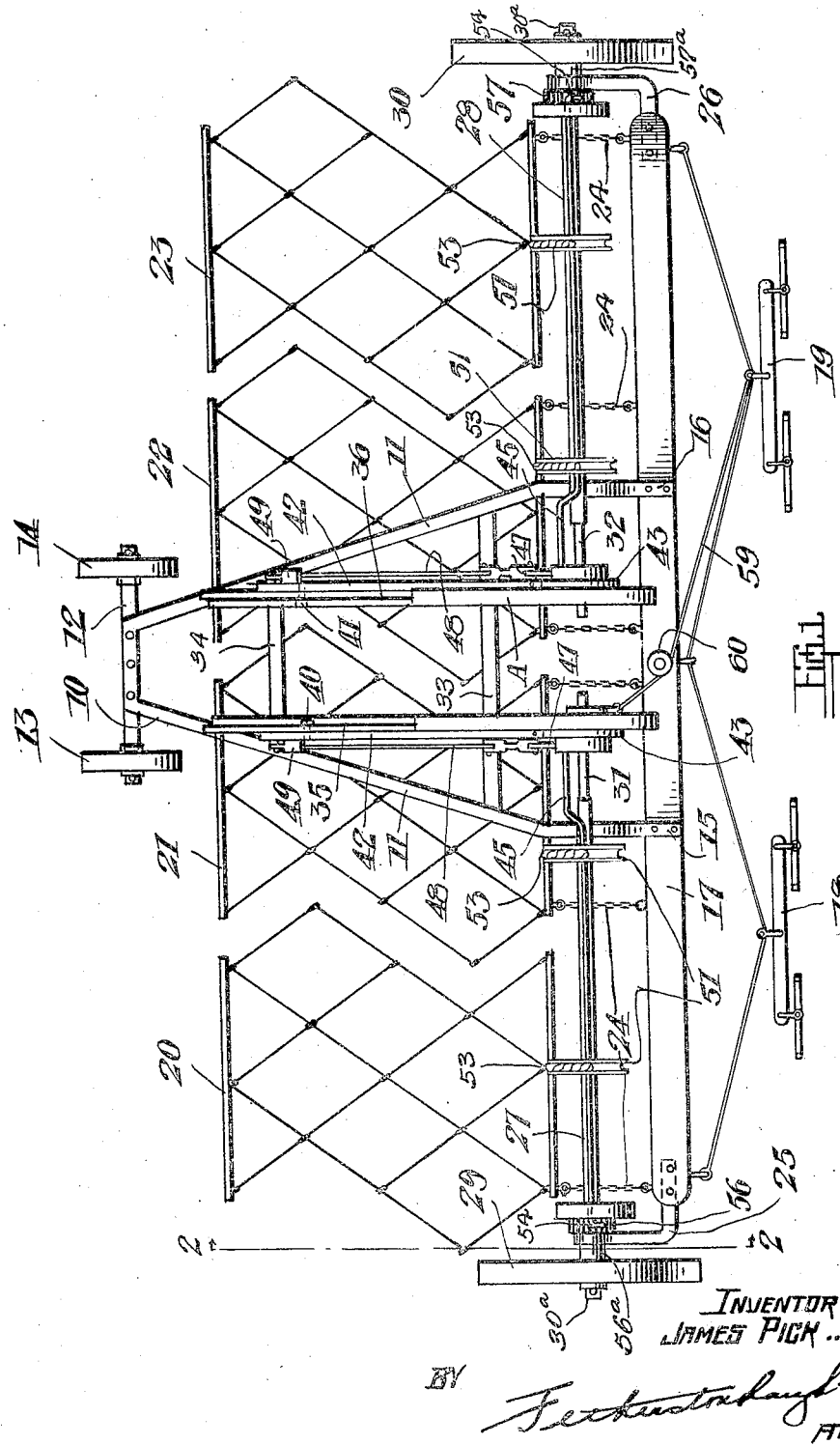

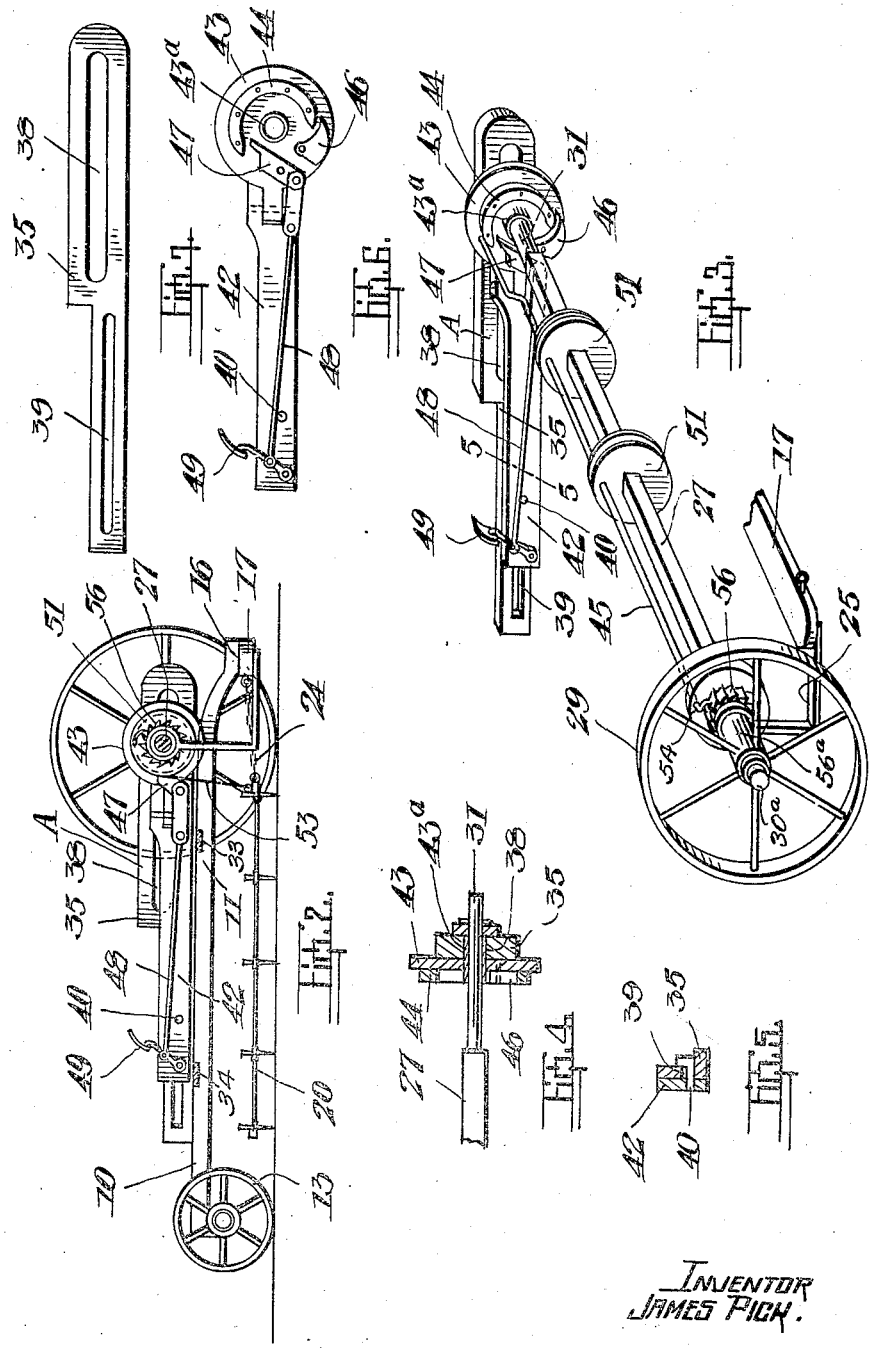

1,575,934

UNITED STATES PATENT OFFICE.

JAMES PICK, OF MARRIOTT, SASKATCHEWAN, CANADA.

HARROW.

Application filed December 29, 1923. Serial No. 683,398.

*To all whom it may concern:*

Be it known that I, JAMES PICK, a subject of the King of Great Britain, and resident of Marriott, in the Province of Saskatchewan and Dominion of Canada, have invented certain new and useful Improvements in Harrows, of which the following is a specification.

This invention relates to improvements in harrows and more particularly to improvements in means for adjusting harrows and the objects of the invention are to provide an economically constructed and efficient device of this character that will enable a harrow to more satisfactorily perform the functions required of it.

With the foregoing and other objects in view, the invention consists essentially in the novel arrangement and construction of parts described in the present specification and illustrated by the accompanying drawings that form part of the same.

Referring now to the drawings, in which like characters of reference indicate corresponding parts in each figure, Figure 1 is a plan view of an embodiment of the improved harrow.

Figure 2 is a section on the line 2—2 of Figure 1.
Figure 3 is a perspective detail of the axle and mechanism for raising and lowering the harrow.

Figure 4 is a sectional detail of the axle in engagement with the trip-carrying members.

Figure 5 is a section on the line 5—5 of Figure 3.

Figure 6 is a side elevation of frame supporting the trip mechanism.
Figure 7 is a side elevation of slotted frame for axle.

In the drawings, A designates an embodiment of my improved harrow as a whole comprising a cart frame 10 consisting of sides 11 obliquely arranged and connected at the rear ends by a cross bar 12 on which are suitably mounted running wheels 13 and 14, the forward ends of the side bars being fixedly connected at 15 and 16 to a draw-bar 17 to which are flexibly connected whiffle-tree members 18 and 19.

20, 21, 22 and 23 are a plurality of harrows connected through chains 24 to the draw-bar 17.
On each end of the draw-bar 17 are secured the bent arms 25 and 26 formed with eyes to engage with axles 27 and 28, to which are connected the field wheels 29 and 30, carried on spindles 30ª.

An essential feature of my improved construction is the axles 27 and 28 which are formed substantially square with cylindrical end portions 31 and 32.

Supported within the frame 10, on cross bars 33 and 34 and extending at right angles to the draw bar, in spaced relationship to one another are frame members 35 and 36 of special formation, as shown in Figure 7 and having therein slots 38 and 39. The slots 38 are adapted to receive the cylindrical end portions 31 and 32, while the slots 39 are designed to receive L-shaped pins 40 extending from the trip frame 42. The pins 40 extending through the slots 39 secure the trip frames to the frame members 35 and 36, while at the same time similar to the axles ends 31 and 32 in the slots 38, the said pins are adapted to slide backwardly in the slots 38, which action takes the strain off the axles, when the sharp turn at the end of the field is being made.

On the outer end of the trip frame 42 disc head pieces 43 are secured, centrally provided with bushings 43ª through which extend the axle ends 31 and 32. The disc head pieces 43 are loosely mounted on these axle ends and provided with semi-circular guideways 44 positioned thereon, for the travel of an operating rod or shaft 45, all more fully described hereafter.

For regulating the engagement of the shafts 45 with the head pieces 43, dogs 46 are pivotally mounted thereon at the outer ends of the guideways 44. At the opposite ends of said guideways and on the head pieces 43, trip members 47 are mounted, operated by the driver of the machine through foot pedals 49 pivotally mounted on the members 42 and link-connected through links 48, with the trip members.

Referring now to the means for raising and lowering the harrows and the operation of the same, these consist of pulley members 51 fixedly mounted on the squared portion of the axles 27 and 28 and designed to engage with cables means 53 connecting them with the harrows, whereby, on the pulleys 51 being operated, the cables are tightened to raise the harrows and, on the pulleys 51 being released to unwind the cables, are loosened to allow the harrows to be lowered.

In order to carry this out, the operating rods 45 offset adjacent their inner ends, extend outwardly parallel with the axles 26 and 27, and pass through the pulley members 51, terminating adjacent the wheels 29 and 30, where they are formed with rearwardly turned engaging ends 54. These ends 54 are adapted on operation of the trip mechanism to engage with ratchet wheels 56 and 57 connected through the inwardly extended hubs 56ᵃ and 57ᵃ with the wheels 29 and 30.

In order that the weight of the machine may be distributed evenly, a tensioning chain or the like 59 is connected to one of the whiffletrees 19 at one end and to the axle 27 at the other end, and adapted to pass around a pulley member 60 on the draw-bar 17.

In operation, when it is desired to raise the harrows, the driver operates the pedals 49 operating the trip members 47, which in turn push the inner ends of the rods 45 in line with the outer surface of the guideway 44, at the same time, through this movement, engaging the outer ends 54 of the rods 45 with the ratchet wheels 56 and 57. The rods 45 then rotate with the land wheels, the inner ends of the rods travelling on the outer surface of the guides 44, and the main portion of the rods passing through the pulley members 51 consequently turn the axles 27 and 28 and the pulley members 51, thus raising the harrows. When the inner ends of the rods 45 travelling on the guideways 44 reach the outer ends of said guideways they come in contact with the dogs 46, and are deflected from their path of travel, disengaging the outer ends 54 of the rods 45 from the ratchet wheels 56 and 57.

On the disengagement of the turned portion 54 of the rod 45, the weight of the suspended harrows rotates the axles 27 and 28 and the pulley members 51 rearwardly, thus lowering themselves, while the inner ends of the rods 45 deflected from their path of travel on the forward movement by the dogs 46 travel around the inner surface of the guideways 44 on the rearward motion and are received at the inner ends of the guideways by the tripping finger of the trip member 47, ready for the next operation.

What I claim as my invention is:

1. A harrow lift of the character described, a frame mounted on land wheels, a drawbar fixedly secured to the frame, axle-supporting brackets for the drawbar, a pair of axles, field wheels rotatably mounted on said axle, pulleys on the axles operatively connected to the harrows, disc head pieces loosely mounted on the inner ends of said axles, guideways on the head pieces, ratchet members on the land wheel, means extending through the pulleys designed to engage the ratchet members and guideways to cause the pulleys to rotate, and means for engaging and automatically disengaging said means.

2. In a device of the character described, the combination with a frame and a pair of axles rotatably supported in said frame and provided with field wheels and a draw-bar, of a plurality of harrows chain-connected to said draw-bar and means for raising and lowering the harrows comprising lifting pulleys fixedly mounted on the machine axles, a longitudinally extending and bent rod through said pulleys, ratchet wheels fixedly mounted adjacent the outer ends of the axles and trip engaging means provided with a guideway loosely mounted on the inner ends of the axles, means on said rod for engaging the ratchet wheels, the inner end of said rod being designed to travel in said trip receiving member and means operated from the driver's seat for disengaging the rod from said member and comprising a trip lever operatively connected to a trip member designed to open and close the guideway on the trip receiving member, whereby, on the guideway being closed, the rod is operated to raise the harrows and whereby, on reaching a predetermined point, the rod is disengaged to automatically lower the harrows.

3. In a device of the character described, the combination with a frame and a pair of axles rotatably supported in said frame and provided with field wheels and a draw-bar, of a plurality of harrows chain-connected to said draw-bar and means for raising and lowering the harrows comprising lifting pulleys fixedly mounted on the machine axles, a longitudinally extending and bent rod through said pulleys, ratchet wheels fixedly mounted adjacent the outer and squared ends of the axles and trip engaging means provided with a guideway loosely mounted on the inner and rounded ends of the axles, means on said rod for engaging the ratchet wheels, the inner end of said rod being designed to travel in said trip receiving member and means operated from the driver's seat for disengaging the rod from said member and comprising a trip lever operatively connected to a trip member designed to open and close the guideway on the trip receiving member, whereby, on the guideway being closed, the rod is operated to raise the harrows and whereby, on reaching a predetermined point, the rod is disengaged to automatically lower the harrows.

4. In a device of the character described and in combination, a frame, a pair of axles supported by said frame and provided with loosely mounted field wheels, a draw-bar for the frame and a plurality of harrows detachably connected to said draw-bar and means for raising or lowering the harrows comprising a lifting pulley fixedly mounted on the axle and a guideway member loosely mounted on the axle, a rod member extending through said pulley and designed to engage with the guideway member, a ratchet wheel on said shaft and means formed on said rod designed to engage with said ratchet wheel whereby, on the field wheel being rotated, the axle is rotated, cable means connecting said pulleys with the harrows whereby, on the axle being rotated by the field wheel, the cables are wound on the pulleys, an operatively mounted trip on the guideway member and means operable from the driver's seat for operating said trip member to open and close the guideway whereby the end of the rod member is engaged or disengaged therefrom to raise or lower the harrows.

5. A device of the character described, comprising a frame, a pair of axles square in cross-section and formed with spindles at each end, a pair of slotted frame members designed to engage with the inner pair of spindles, a pair of land wheels loosely carried on the outer pair of spindles, pulleys fixedly mounted on said axles and flexibly connected with a plurality of harrows, ratchet members on said wheels, disc head pieces connected to the slotted frame members and loosely mounted on the inner spindles, guideways on said pieces, rods extending through the pulleys and adapted to engage the ratchet members and the guideways, means operable from the driver's seat to engage with said rods to wind the pulleys, means for automatically disengaging said rods to unwind said pulleys, and means for returning the rods to starting position.

In witness whereof I have hereunto set my hand.

JAMES PICK.